(12) United States Patent
Beveridge et al.

(10) Patent No.: US 12,008,006 B1
(45) Date of Patent: Jun. 11, 2024

(54) ASSESSMENTS BASED ON DATA THAT CHANGES RETROACTIVELY

(71) Applicant: Palantir Technologies Inc., Palo Alto, CA (US)

(72) Inventors: Anita Beveridge, New York, NY (US); Alec Schneider, New York, NY (US); Henry Stoke, London (GB); Marissa Miracolo, Brooklyn, NY (US)

(73) Assignee: Palantir Technologies Inc., Denver, CO (US)

( * ) Notice: Subject to any disclaimer, the term of this patent is extended or adjusted under 35 U.S.C. 154(b) by 166 days.

(21) Appl. No.: 16/872,255

(22) Filed: May 11, 2020

Related U.S. Application Data

(60) Provisional application No. 62/895,900, filed on Sep. 4, 2019.

(51) Int. Cl.
*G06F 7/00* (2006.01)
*G06F 16/21* (2019.01)
*G06F 16/2458* (2019.01)

(52) U.S. Cl.
CPC ........ *G06F 16/2474* (2019.01); *G06F 16/219* (2019.01); *G06F 16/2477* (2019.01)

(58) Field of Classification Search
CPC ............... G06F 16/2474; G06F 16/219; G06F 16/2477; G06F 16/2329
See application file for complete search history.

(56) References Cited

U.S. PATENT DOCUMENTS

| 5,706,509 | A  | * | 1/1998 | Man-Hak Tso | ......... G06F 16/27 707/625 |
| 10,956,132 | B1 | * | 3/2021 | Schneider | ................. G06F 8/40 |
| 2003/0004990 | A1 | * | 1/2003 | Draper | .............. H04L 29/06027 715/234 |
| 2007/0078909 | A1 | * | 4/2007 | Tamatsu | ................ G06F 16/221 707/999.203 |
| 2009/0138342 | A1 | * | 5/2009 | Otto | ....................... G06N 5/025 706/45 |
| 2014/0279979 | A1 | * | 9/2014 | Yost | ...................... G06F 16/904 707/798 |

* cited by examiner

*Primary Examiner* — Mohammed R Uddin
(74) *Attorney, Agent, or Firm* — Faegre Drinker Biddle & Reath LLP

(57) ABSTRACT

A system enables analysis of retroactively changing datasets and/or of various versions of logics. In an example, the system determines a first version of data and/or a first version of a logic and a second version of the data and/or a second version of the logic, wherein at least some of the second version of the data was retroactively added. The system determines two outputs each derived from one of a) applying the first version of the logic to the first version of the data, b) applying the second version of the logic to the first version of the data, c) applying the first version of the logic to the second version of the data, or d) applying the second version of the logic to the second version of the data. The system compares the outputs and determines one or more differences between the outputs.

20 Claims, 11 Drawing Sheets

445

Determine, at a first time, at least one of a) a first version of one or more datasets comprising data that was used at a second time that predates the first time, b) a first version of a logic that was used at the second time, or c) a first version of parameters to the logic that were used at the second time 450

Determine, at the first time, at least one of a second version of the one or more datasets, a second version of the logic, or a second version of the parameters 455

Determine a first output derived from a first one of a) the first version of the one or more datasets, the first version of the logic, and the first version of the parameters, b) the first version of the one or more datasets, the first version of the logic, and the second version of the parameters, c) the first version of the one or more datasets, the second version of the logic, and the first version of the parameters, d) the second version of the one or more datasets, the first version of the logic, and the first version of the parameters, e) the first version of the one or more datasets, the second version of the logic, and the second version of the parameters, f) the second version of the one or more datasets, the second version of the logic, and the first version of the parameters, or g) the second version of the one or more datasets, the second version of the logic, and the second version of the parameters 460

Determine a second output derived from a second one of a) the first version of the one or more datasets, the first version of the logic, and the first version of the parameters, b) the first version of the one or more datasets, the first version of the logic, and the second version of the parameters, c) the first version of the one or more datasets, the second version of the logic, and the first version of the parameters, d) the second version of the one or more datasets, the first version of the logic, and the first version of the parameters, e) the first version of the one or more datasets, the second version of the logic, and the second version of the parameters, f) the second version of the one or more datasets, the second version of the logic, and the first version of the parameters, or g) the second version of the one or more datasets, the second version of the logic, and the second version of the parameters 465

Compare the first output to the second output 470

Differences in outputs? 475 —NO→ Indicate no differences 485

YES

Provide indication (e.g., alert) of determined difference(s) 480

Determine, at a first time, a) a first version of one or more datasets comprising data that was used at a second time that predates the first time and b) a first version of a logic that was used at the second time 505

Determine a first output derived from applying the first version of the logic to the first version of the one or more datasets, where first output is associated with one or more suggested actions 515

Determine, at the first time, one or more performed actions that were performed in connection with the first output 520

Compare the performed action(s) to the suggested action(s) 525

Differences between performed and suggested actions? 530 — NO → Indicate no differences 550

YES

Provide indication of determined difference(s) 535

Fig. 5

ASSESSMENTS BASED ON DATA THAT CHANGES RETROACTIVELY

RELATED APPLICATIONS

This patent application claims the benefit under 35 U.S.C. § 119(e) of U.S. Provisional Application No. 62/895,900, filed Sep. 4, 2019, which is herein incorporated by reference.

TECHNICAL FIELD

This disclosure relates to the field of data aggregation and analysis systems, and in particular to analyzing and/or operating on datasets that may be changed retroactively.

BACKGROUND

Modern data centers often comprise thousands of hosts that operate collectively to service requests from even larger numbers of remote clients. During operation, components of these data centers can produce significant volumes of machine-generated data. A computerized data pipeline is a useful mechanism for processing those large amounts of data. A typical data pipeline is an ad-hoc collection of computer software scripts and programs for processing data extracted from "data sources" and for providing the processed data to "data sinks." As an example, a data pipeline for a large insurance company that has recently acquired a number of smaller insurance companies may extract policy and claim data from the individual database systems of the smaller insurance companies, transform and validate the insurance data in some way, and provide validated and transformed data to various analytical platforms for assessing risk management, compliance with regulations, fraud, etc.

Between the data sources and the data sinks, a data pipeline system is typically provided as a software platform to automate the movement and transformation of data from the data sources to the data sinks. In essence, the data pipeline system shields the data sinks from having to interface with the data sources or even being configured to process data in the particular formats provided by the data sources. Typically, data from the data sources received by the data sinks is processed by the data pipeline system in some way. For example, a data sink may receive data from the data pipeline system that is a combination (e.g., a join) of data of from multiple data sources, all without the data sink being configured to process the individual constituent data formats.

Given the increasing amount of data collected by businesses and other organizations, processing data of all sorts through data pipeline systems can only be expected to increase. This trend is coupled with a need for a more automated way to maintain such systems and for the ability to trace and track data, including old versions of the data, as it moves through the data pipeline from data sources to data sinks.

Data may be collected and processed using logic, and decisions may be made based on the available data. In some industries, the data may be changed retroactively. Such retroactive changes to data may make it difficult to determine if the decisions that were made at a time based on the then available data were correct decisions.

BRIEF DESCRIPTION OF THE DRAWINGS

The present disclosure will be understood more fully from the detailed description given below and from the accompanying drawings of various implementations thereof, which, however, should not be taken to limit the present disclosure to the specific implementations, but are for explanation and understanding only.

FIG. 4B is a flow diagram illustrating a method of comparing scenarios of a data pipeline, according to an implementation.

FIG. 5 is a flow diagram illustrating a method of rolling back a state of a data pipeline to determine suggested and performed actions at a past time and to make determinations based on the suggested and performed actions, according to an implementation.

DETAILED DESCRIPTION

Figure 1:
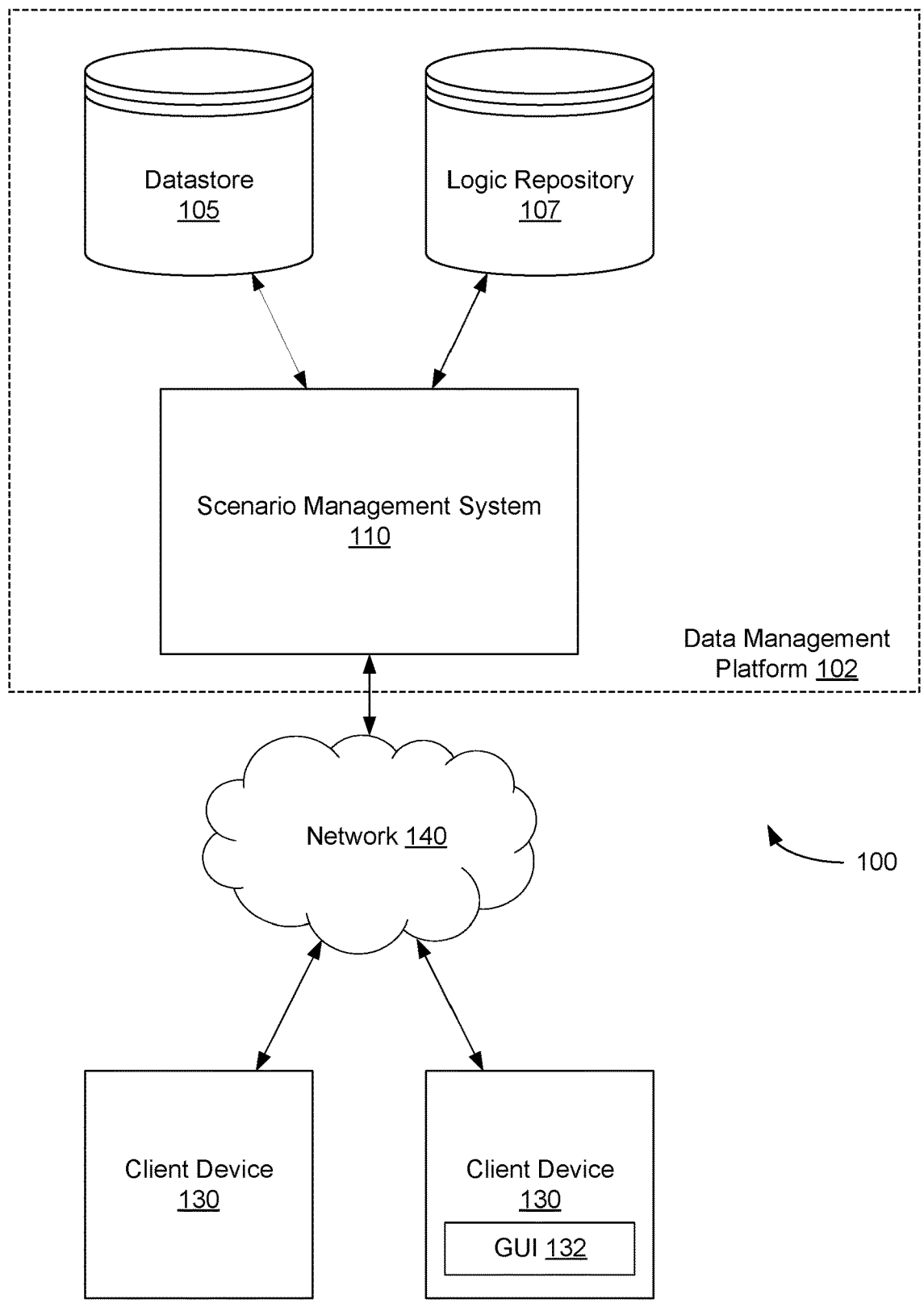
FIG. 1 is a block diagram illustrating a network environment in which a scenario management system may operate, according to an implementation.

The following description sets forth numerous specific details such as examples of specific systems, components, methods, and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Aspects of the present disclosure are directed to a scenario management system that applies logic to retroactively changed datasets in a manner that enables historic versions of the retroactively changed datasets (versions of the datasets that existed before the retroactive changes were made) to be used. This can involve performing a series of transformations of arbitrary complexity and generality. Such transformations may include stateful and/or stateless transformations, which may or may not be incremental in nature. Examples of retroactive changes to datasets are changes that include updates to historical data for a past month, a past year, etc. In other words, updates to datasets may include not only current data, but also updates to past data (including not just information from the period since the last update was received, but also information predating that period). The same logic or different logic may also be applied to the original versions of the retroactively changed datasets and/or to the retroactively changed versions of the datasets (versions of the datasets that existed after the retroactive changes were made). Each application of logic to input datasets may generate an output (e.g., a derived dataset). Outputs may be compared, and determinations may be made based on the comparison.

Some datasets, such as sales datasets, are frequently updated retroactively. Logic is applied to at hand historical data to determine suggested actions. Such determinations can be performed periodically based on at hand historical data. For example, a call plan for a sales representative may be generated based on at hand historical data. After the logic is applied to the at hand historical data, one or more updates may be received that retroactively change that historical data. Such changes may cause one or more optimal actions to differ from the originally suggested and/or performed actions.

In a traditional system, if a user attempts to re-apply the logic at a later date after the one or more updates that included the retroactive changes to the historical data, the retroactive changes would generally be included in the dataset to which the logic is re-applied. This can cause the newly suggested actions that are determined based on the re-application of the logic to be different from the originally suggested and/or performed actions.

Additionally, the logic itself may change over time. When a new version of logic is generated, conventionally it is applied to the dataset that includes retroactive changes and does not provide an output that is based on the original dataset and the new version of the logic. As a result, it is not generally possible to compare the output of the new version of the logic with the originally generated output in conventional data management systems.

Aspects of the present disclosure address the above and other deficiencies by providing a tool (e.g., a scenario management system) that allows users to compare the outputs of different logics and/or versions of datasets (optionally in pipeline workflows) that may receive retroactive changes. The tool can be used to create a data structure that includes one or more input datasets, a logic to apply to the one or more input datasets, and an output. The data structure may represent a portion (e.g., a particular data transformation step) of a data pipeline in embodiments. A data pipeline may refer to an ordered set of logic (e.g., a collection of computer software scripts or programs) that performs a multi-step transformation of data obtained from data sources to produce one or more outputs (derived datasets). Each data transformation step applies logic to one or more initial datasets (i.e. collections of data) to produce one or more derived datasets.

The data structure, referred to herein as a scenario, provides an association between one or more initial datasets, data transformation logic, optionally parameters for the transformation logic, and one or more outputs (also referred to as derived datasets) resulting from application of the data transformation logic to the initial dataset(s). The scenario may represent the relationships between the initial dataset(s), the data transformation logic, the parameters for the data transformation logic, and/or the derived dataset(s) in the form of a dependency graph, in which the nodes represent the datasets, and the edges represent the data transformation logic, such that if two nodes are connected by the edge, then the dataset referenced by the second node may be produced by applying, to the dataset referenced by the first node, the data transformation logic referenced by the edge connecting the two nodes. For example, a user interface may be provided to present the above components of the scenario and their relationships as a dependency graph with the above structure. The user interface may provide one or more knobs (e.g., user interface input elements or input devices) that enable the user to select a specific date/time, specific version of a dataset for the date/time, and a specific version of logic for each scenario to be compared.

In embodiments, a user is able to identify (e.g., select or enter) a specific version of a dataset, a specific version of logic, and/or a specific set of parameters for the logic, where the specific version of the dataset may include data predating a particular date/time (e.g., a date/time when the user identifies the specific version of the dataset and/or the specific version of logic or a date/time when the user requests that the specific version of logic be applied to the specific version of the dataset). The user may select the version of the dataset that was available at the particular date/time or a version of the dataset that includes additional retroactively added data that predates the particular date/time but that was not previously available at the particular date/time. In some embodiments, the user may also be able to select a specific version of logic to be applied to the modified version of the dataset (e.g., the original version of logic that was applied to the original version of the dataset at the particular date/time or a subsequently modified version of logic). Different knobs may be provided that enable the user to select each of these options. A user may make multiple different selections, each of which may provide a different output, and may then compare the outputs. Decisions may then be made based on the comparison, such as decisions regarding whether an optimal course of action was taken, whether a particular version of logic is superior or inferior to another version of logic, whether logic should be adjusted, and so on.

In a first example, a user may select an originally available dataset that was available at a particular time and an original version of logic, and determine what output and, as a result, what actions were suggested based on the determined outputs. These suggested actions may then be compared to actions that were actually performed to determine whether the suggestions were followed.

In a second example, a user may select an originally available dataset that was available at a particular time and an original version of logic, and determine what output was generated and, as a result, what actions were indicated based on the determined output. The user may also select a retroactively modified dataset (that includes data that predates the particular time but that was not originally available) and the original version of the logic, and determine what actions are indicated. The originally indicated actions may be compared to the newly indicated actions to determine any differences.

In a third example, a user may select an originally available dataset that was available at a particular time and an original version of logic, and determine what output was generated and, as a result, what actions were indicated based on the determined output. The user may also select the originally available dataset and a new version of the logic, and determine what output was generated and what actions are indicated. The originally indicated actions may be compared to the newly indicated actions to determine any differences. Such differences can be used to determine whether the new version of the logic is superior to the original version of the logic. Additionally, the differences between the outputs may be used to correct apparently pathological behavior (e.g., severe and/or unexplained bugs) in logic. For example, original code (i.e., logic) known to have bugs may be run against historical data. Additionally, new code may be run against the historical data to check if the errors persist. It may be determined if the errors persist based on similarities and/or differences between the outputs. If the errors persist, then it can be determined that the bugs have not been corrected. If the errors do not persist, then it can be determined that the bugs have been corrected.

In some embodiments, the scenario management system provides an ability to experiment with introducing changes to one or more data transformation steps of a data pipeline (e.g., by changing the logic or using a different dataset) in a manner that does not result in the loss of original dataset or original logic or an interruption of the data pipeline. The scenario management system may be tailored for data analysis associated with a data pipeline at a certain point in time, including the state of both the logic and the dataset(s) to which the logic is applied. The scenario management system may provide an ability to experiment on the data pipeline without affecting the logic or the dataset(s).

In embodiments, workbooks may be generated for comparison of scenarios. A workbook may be a data structure that can contain multiple scenarios. In embodiments, the scenarios in a workbook may be branches of a data pipeline.

The technology described herein allows users to use old versions of retroactively changed datasets (versions that existed before the retroactive change were made) with new or old logic to obtain an output. Users are further able to use the old versions of the retroactively changed datasets (including retroactive changes) with new logic and/or use the modified versions of the datasets (including the retroactive changes) with the old logic and/or new logic to obtain an output. Comparisons can be made between any of these outputs, and decisions can be made based on a result of the comparisons. In embodiments, the scenario management system provides a user interface that enables the selection of specific versions of datasets and logics, and such datasets and logics may be used in a scenario without retrieval of data backups or a resource intensive search operation (e.g., that would be performed in an attempt to identify retroactive changes that were made to datasets in conventional systems). Accordingly, embodiments provide otherwise unavailable functionality in scenario management systems and databases, and additionally may reduce processor and/or memory utilization associated with using original versions of retroactively changed data to versions of logic.

FIG. 1 is a block diagram illustrating a network environment in which a scenario management system may operate, according to an implementation. The network environment 100 can include one or more client devices 130 and a data management platform 102, which can be in data communication with each other via network 140. Computer system 900 illustrated in FIG. 9 may be one example of any of client devices 130 or a server(s) in the data management platform 102. The network 140 may include, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

Client devices 130 may include processor-based systems such as computer systems. Such computer systems may be embodied in the form of desktop computers, laptop computers, personal digital assistants, cellular telephones, smartphones, set-top boxes, music players, web pads, tablet computer systems, game consoles, electronic book readers, or other devices with similar capability.

Data management platform 102 may include, for example, a server computer or any other system providing computing capability. Alternatively, data management platform 102 may employ a plurality of computing devices that may be arranged, for example, in one or more server banks or computer banks or other arrangements. Such computing devices may be positioned in a single location or may be distributed among many different geographical locations. For example, data management platform 102 may include a plurality of computing devices that together may comprise a hosted computing resource, a grid computing resource and/or any other distributed computing arrangement. In some cases, data management platform 102 may correspond to an elastic computing resource where the allotted capacity of processing, network, storage, or other computing-related resources may vary over time.

In some implementations, data management platform 102 can include scenario management system 110, datastore 105 storing the underlying data (e.g., enterprise data), and a logic repository 107 storing one or more logics that perform operations on datasets from the datastore 105. The logic repository 107 may include data for one or more pipelines, where a pipeline includes a set of logic to execute a series of data transformation steps on one or more initial datasets stored in datastore 105. Each data transformation step produces one or more outputs (e.g., derived datasets) that may also be stored in datastore 105. Depending on the implementation, datastore 105 and logic repository 107 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium. The logic repository 107 may be part of the datastore 105 or may be a separate repository including, for example, a database, one or more tables, one or more files, etc.

Datastore 105 may include structured and/or unstructured sets of data that can be divided/extracted for provisioning when needed by one or more components of the scenario management system 110. Datastore 105 may include one or more versioned datasets of information. The dataset(s) may be stored in one or more databases, such as a relational database. A relational database may organize information/data into tables, columns, rows, and/or other organizational groupings. Groupings of information may be linked/referenced via use of keys (e.g., primary and foreign keys).

In one implementation, the datasets in datastore 105 are both "immutable" and "versioned" datasets. A dataset may be defined as a named collection of data. The datasets are "immutable" in the sense that it is not possible to overwrite existing dataset data in order to modify the dataset. The datasets are "versioned" in the sense that modifications to a dataset, including historical modifications, are separately identifiable.

Because datasets are immutable and versioned, it is possible to determine the data in a dataset at a point in time in the past, even if that data is no longer in the current version of the dataset. More generally, the ability to trace dataset data to the data source data from which the dataset data was derived or obtained, even if the dataset data is no longer in the current version of the dataset and even if the data source data is no longer available from the data source, is maintained. In embodiments, one or more of the datasets stored in datastore 105 are datasets that receive periodic retroactive updates. For example, a dataset may include retroactively added data that has a particular timestamp (e.g., June, 2000, optionally plus the time to process data in the pipeline) but that was added at a later time that is past the particular timestamp (e.g., September, 2000). A traditional datastore would typically overwrite the original version of the data with the retroactive modifications to the data. Such a traditional datastore would not keep track of what version of historical data that predates a particular time was available at the particular time. Additionally, a traditional datastore typically would not keep track of a specific version of logic that was used at the particular time. However, since the datasets in datastore 105 are immutable and versioned, and versions of logic are immutable and versioned, a new version of the dataset is generated with the retroactive modifications included therein when the retroactive updates are made. At a later time, specific versions of the datasets (e.g., dataset versions that include retroactive changes or dataset versions that exclude retroactive changes) and/or a specific version of a logic may be selected as appropriate. Embodiments enable a user to select appropriate versions of datasets and logics, which enable many types of comparisons. Additionally, embodiments enable bug tracking by providing an ability to select logic that was available at any particular time and dataset versions that were available at any particular time, thereby enabling recreation of previous states.

An initial dataset may be raw (i.e., un-edited) data that comes directly from a data source (e.g., a full list of customer accounts) and represents the starting point of a data pipeline. Alternatively, an initial dataset may be a derived dataset, which is a dataset that is generated (i.e., built) by editing (e.g., manually or by executing logic of a data transformation step from logic repository 107) one or more initial datasets. A derived dataset (output of a logic) may be potentially further transformed to provide one or more other datasets as input to a next data transformation step. Each data transformation step may perform one or more operations on the input dataset(s) to produce one or more derived datasets (outputs). For example, a data transformation step may produce a derived dataset by filtering records in an input dataset to those comprising a particular value or set of values, or by joining together two related input datasets, or by replacing references in an input dataset to values in another input dataset with actual data referenced. Because derived datasets (outputs), like datasets generally, are immutable and versioned in the system, it is possible to trace dataset data to the data source data from which the dataset data was derived or obtained (e.g., prior to retroactive changes), even if the dataset data is no longer in the current version of the derived dataset (e.g., that includes retroactive changes) and even if the data source data is no longer available from the data source.

In one implementation, data transformation logic stored in logic repository 107 is also versioned. Doing so not only provides the ability to trace dataset data to the data source data the dataset data is based on, but also, if the dataset is a derived dataset (output of a logic), to the version of the data transformation logic used to build the derived dataset (derive the output). This can be useful for tracking down errors in dataset data caused by errors or "bugs" (i.e., programming errors) in the version of the data transformation logic that was executed to build the derived dataset (produce the output).

Scenario management system 110 can assist users in experimenting with data pipelines. In particular, scenario management system 110 may create (e.g., based on user input) a data structure (referred to herein as a scenario) to represent one or more data transformation steps of a data pipeline. A scenario is an association of the initial dataset(s) and the logic (e.g., processing logic and/or business logic) to be applied to the initial dataset(s) to generate one or more derived datasets (outputs). A scenario may also include parameters to the logic, such as date limits, p-values, and so on. In the various implementations described herein, a scenario may be described as including one initial dataset or multiple initial datasets, one piece of data transformation logic or multiple pieces of data transformation logic, one derived dataset or multiple derived datasets, one or more parameters to logic, or any combination of the above.

A scenario may include one or more pointers to one or more snapshots of one or more initial datasets from datastore 105, a first logic from logic repository 107, and one or more pointers to one or more snapshots of one or more first derived datasets from datastore 105 resulting from using the first logic with the one or more initial datasets. A snapshot of a dataset (e.g., an initial dataset or a derived dataset) captures the state of the corresponding dataset at the point in time that the snapshot was created. As datastore 105 has versioned datasets, each version of a given dataset may represent a corresponding snapshot. For example, each time a change is made to a given dataset, a new version of that dataset (and corresponding snapshot) may be created and stored in datastore 105. Any changes made to the initial dataset by other programs or logic accessing datastore 105 after the snapshot is captured will not affect the snapshot being worked on in the scenario. In one implementation, the scenario includes a pointer to the snapshot, which is physically stored in datastore 105. The pointer may include a computing object that stores a reference to the corresponding snapshot, such as a memory address of the snapshot in datastore 105, a unique identifier of the snapshot, or some other indicative value. Similarly, the scenario may include one or more pointers to one or more snapshots of any derived datasets resulting from execution of the logic against the one or more initial datasets or other previously derived dataset(s).

In embodiments, scenario management system may create workbooks, where a workbook may be a data structure that can include multiple scenarios to be compared. As used herein, a workbook includes a data analysis workbook, which may be an application, or sheet or page within an application, that enables users to load and manipulate datasets and which may enable running one or more data analysis programs or scripts on all or some of the data of the datasets, e.g. to produce graphical output. Workbooks may also include text, equations, and/or mark-up language snippets (e.g. HTML snippets). The text, equations, and/or mark-up language, when rendered, may be used to explain the data analysis scripts, the datasets and/or the graphical output. A workbook may also be referred to as 'notebook' or 'notebook document'. In some embodiments, a workbook may include a "branch" of a data pipeline. One or more branches may be generated to run experiments on modified logics and/or modified datasets, where each branch may be associated with a different scenario.

In embodiments, a branching tool can be used to create a workbook representing a portion (e.g., a particular data transformation step) of the data pipeline. The workbook may be similar to a scenario, in that it provides an association between one or more initial datasets, data transformation logic and one or more derived datasets resulting from application of the data transformation logic to the initial dataset(s). The workbook represents the relationships between the initial dataset(s), the data transformation logic and the derived dataset(s) in the form of a dependency graph, in which the nodes represent the datasets, and the edges represent the data transformation logic, such that if two nodes are connected by the edge, then the dataset referenced by the second node may be produced by applying, to the dataset referenced by the first node, the data transformation logic referenced by the edge connecting the two nodes.

When a user creates a new workbook for a portion of a data pipeline, a master branch may be formed including one or more initial (e.g., imported) datasets and any logic specified by the user. If the user decides to experiment with a data pipeline portion that corresponds to the master branch, the branching tool can create a new scenario for a test branch in the workbook in which the user can experiment. The test branch may include a copy of the logic from the master branch and a pointer(s) to snapshot(s) (or version(s)) of the dataset(s) from the master branch taken at the time the test branch was created. Each of the master branch and the test branch may be a separate scenario. The scenario management system 110 keeps track of the state of each dataset at the time of branch creation and any logic (also referred to as a data transformation) run on the test branch will use the stored state to load data. The user can use the test branch to modify logic and derive one or more new datasets without impacting the logic and data in the master branch. In addition, any changes to the master branch will not impact the test branch, which uses the stored state of data and logic from the time of branch creation.

After experimenting with a test branch, a user can request to merge the test branch back into the master branch. A merge preview may show the changes that will be introduced into the master branch as a result of the merge, giving the user a chance to resolve any conflicts before completing the merge. For example, the merge preview may display certain features such as changes to a logic, a change in the number of rows or columns in a derived dataset, a change in contents of a derived dataset, a visualization of the change, etc., and allows the user to choose what logic and/or datasets to use in case of merge conflicts. If the logic of the test branch is selected during the merge preview, the system completes the merge by modifying the logic of the master branch (e.g., by overwriting it with the changes made in the test branch). The system may also reassign the pointers from the master branch to the snapshots of the dataset(s) produced by the logic of the test branch.

It should be understood that the concept of branching described herein is applicable to any selected collection of initial datasets, logic, and derived datasets that are associated with one another via a dependency graph structure. In an example, in response to such a selection, scenario management system 110 may create a scenario for a test branch associated with a scenario for a master branch of the data pipeline. The master branch and the test branch may be two different scenarios that may be included in a single workbook. The master branch can be created by scenario management system 110 by default. Scenarios for one or more test branches (e.g., child branches or dependent branches) can then be created from the master branch in response to respective user requests. In an example, dummy data may be added to one or more dataset that is input into a logic in a test branch. The dummy data may be based on assumptions of future activity or unknown current activity. The dummy data may include predictions of retroactive changes that are expected to be made to a dataset, but which have not yet occurred, for example.

In some instances, a first scenario of a workbook may represent a master branch of a data pipeline. A second scenario may be generated for the workbook, which may represent a test branch of the data pipeline that is associated with the master branch. When the test branch is created, it may include the pointer(s) to the snapshot(s) of the initial dataset(s) in datastore 105 and a copy of the first logic from logic repository 107. Scenario management system 110 permits the user to experiment in the test branch, such as by modifying or deleting the existing logic, adding new logic, deriving new datasets, etc., all without impacting the logic and data in the master branch. Although associated with the master branch in a parent/child relationship according to a hierarchy of scenario branches (e.g., the test branch being a copy of the state of the master branch at the time the test branch is created), the test branch is logically separate from the master branch in that changes to the test branch will not be replicated or duplicated in the master branch until the test branch is merged back into the master branch at the request of the user. In addition, any changes to the master branch made after the test branch was created (e.g., as the result of another test branch being merged into the master branch) will not impact the test branch, which uses the stored state of data and logic from the time of test branch creation.

Scenario management system 110 can generate multiple different scenarios, each of which may use a distinct set of one or more selected datasets with one or more selected logics (and optionally one or more selected parameters for the logics) to produce respective outputs (e.g., derived datasets). Scenario management system 110 may then compare the outputs of different scenarios, as described in greater detail below. Based on the comparison, scenario management system 110 may determine one or more differences between the outputs (e.g., derived datasets) in the different scenarios. This may include determining differences between an output of a test branch and an output of a master branch. Scenario management system 110 may generate an indication of these differences and present that indication to the user on one of client devices 130.

In an example, a first scenario may include an originally available dataset that was available at a particular time and an original version of logic. The original version of the logic may be applied to the originally available dataset to determine an original output. The original output may include one or more actions that were suggested or the suggested actions may be derived or determined (e.g., based on additional logic) from the original output. Scenario management system 110 may compare the suggested actions to actions that were actually performed to determine whether the suggestions were followed.

For example, in the pharmaceutical industry sales representatives of pharmaceutical companies are generally provided a call plan based on at hand historical data that specifies or suggests which companies, hospitals, physicians, nurses, midwives, etc. the sales representatives should contact. These call plans are generated based on one or more datasets which may include information about customers (e.g., companies, hospitals, physicians, etc.), insurance claim information, records of pharmaceutical sales to the customers, and so on. Some of these datasets, such as insurance claim information, etc., may evolve over time, with each evolution potentially including retroactive changes to the data.

At a given time, at hand datasets may be used with a logic that ingests the datasets and produces an output that includes a call plan or that can be used to generate a call plan. As retroactive changes are made to the datasets, the call plan may change. However, it can be useful to determine what the call plan was at a previous time based on the data that was known at the time. Embodiments enable such a determination to be made. The original call plan (or other suggested actions) may be compared by scenario management system 110 to actual actions that were performed (e.g., actual calls to customers that were made by sales representatives) to determine whether the sales representatives were following the call plan specified in the output of the logic. The actual actions that were performed may be stored in datastore 105.

In another example, a first scenario may include an originally available dataset that was available at a particular time and an original version of logic. The first scenario may further include a first determined output. A second scenario may include a retroactively modified dataset (that includes data that predates the particular time but that was not available when the first output was determined) and the original version of the logic. The second scenario may further include a second determined output. The first output may be compared to the second output to determine if the output changed based on the retroactive changes to the dataset.

Continuing the example of the sales representative for the pharmaceutical company, the first output may include an actual call plan that was provided for the sales representative, and the second output may include an optimal call plan that would have been provided had all of the relevant information been known at the time. The original call plan may be compared to the optimal call plan to determine any differences there between.

In another example, in the financial services industry trade alerts may be generated that indicate questionable or inappropriate trades that might violate one or more laws and/or company rules. In such an example, the first output may include actual trade alerts that were generated, and the second output may include new trade alerts that would have been generated had all of the relevant information been known at the time. The original trade alerts may be compared to the new trade alerts to determine if there were any inappropriate trades that had not been flagged at around the time of the trades.

In yet another example, a first scenario may include a first dataset, a first logic, and a first set of one or more parameters for the first logic. The first scenario may further include a first determined output (e.g., including indicated actions). A second scenario may include the first dataset, the first logic, and a second set of one or more parameters for the first logic. The second scenario may further include a second determined output (e.g., including indicated actions). The differences between the outputs may be used to perform parameter calibration and/or parameter testing.

In yet another example, a first scenario may include an originally available dataset that was available at a particular time and an original version of logic. The first scenario may further include a first determined output (e.g., including indicated actions). A second scenario may include the originally available dataset and a new version of the logic, and may further include a second determined output (e.g., including newly indicated actions). The originally indicated actions may be compared to the newly indicated actions to determine any differences. Such differences can be used to determine whether the new version of the logic is superior to the original version of the logic. If the new version of the logic is superior, than a pipeline may be updated to use the new version of the logic.

Continuing the example of the sales representative for the pharmaceutical company, the first output may include an actual call plan that was provided for the sales representative, and the second output may include a different call plan that would have been provided had a new logic been applied to the originally known data. The original call plan may be compared to the new call plan to determine any differences there between.

Continuing the example of the financial services company, the first output may include actual trade alerts that were generated, and the second output may include new trade alerts that would have been generated had a new logic been applied to the originally known data. The new logic may include, for example, a new law (e.g., governing insider trading). The actual trade alerts may be compared to the new trade alerts to determine any differences therebetween.

As discussed above, a particular scenario may be a data structure that represents a portion (e.g., a particular data transformation step) of a data pipeline. The data pipeline may include an ordered set of logic (e.g., a collection of computer software scripts or programs) that performs a multi-step transformation of data obtained from data sources (input datasets) to produce one or more outputs (derived datasets). One or more transformations in the series of transformations of the data pipeline may be performed periodically. For example, all of the logics of the entire data pipeline may be executed on input datasets periodically. Each iteration of executing the data pipeline may be performed using particular versions of datasets and particular versions of logics in the data pipeline. Data identifying each of the versions of datasets and logics that are used at each iteration of execution of the data pipeline may be stored along with a timestamp of when the iteration was performed.

At any future time after a particular iteration of the data pipeline was performed, the system (e.g., the production system or master system) may be rolled back to a state reflecting the state of the data pipeline (or a portion of the data pipeline) at the time that the particular iteration was performed, including the particular versions of the logics and the particular versions of the datasets that were used, and the particular derived datasets that were output.

In embodiments, the data management platform 102 provides a full audit trail of the state of the data pipeline, including when updates were made to datasets, when updates were made to logics, all actions suggested by an output of a logic of the data pipeline and/or actions performed by a user and/or a logic. Operations of the data pipeline may have been executed on a periodic basis. The full audit trail may enable users to determine when operations were performed (e.g., when specific versions of logics were applied to specific versions of datasets) and their associated outputs. Additionally, the full audit trail may enable users to select different times at which operations were not performed (e.g., times at which a logic was not applied to datasets), and determine what outputs would have been generated had the operations been performed at those times.

In an example, for a data pipeline that generates call plans and alerts for sales representatives, versions of input datasets may include information that was known at the time with respect to customers (e.g., companies, hospitals, physicians, etc.), insurance claim information, records of pharmaceutical sales to the customers, actual actions performed by sales representatives, and so on. Various derived datasets output by versions of logics in the data pipeline may include alerts to the sales representatives, call plans for the sales representatives, and so on.

A user may interact with a user interface to cause a state of the data pipeline to roll back to a state as it existed at a particular point in time. Accordingly, a user may determine for a specific point in time what a suggested action was and whether the suggested action was performed, even if the data in one or more datasets has been retroactively changed. Additionally, a user may specify for a particular point in time alternate versions of data than those that were actually used in the data pipeline (e.g., versions of datasets that include retroactive changes to the data in the datasets) and/or alternate versions of logics than those that were actually used. This may enable users to determine, for example, what would have happened had the currently known information been available at the particular point in time. This may also enable users to determine, for example, what would have happened if current versions of one or more logics in the data pipeline were used to process the datasets as they existed at the particular point in time (i.e., without any retroactive changes to the datasets that were made after the particular point in time). Comparisons may be made between two or more different scenarios to determine how the outputs (e.g., decisions and/or actions) may vary between them. If differences are identified, then the system may generate an alert that indicates differences between what actions were actually suggested and/or performed and what actions should have been performed. Suggested actions may include a suggested best action, a suggested next best action for a group tasked with remediation of errors or other actions based on results from the data pipeline. Such suggested actions may be compared against actions that were actually performed.

Continuing the example of the sales representative for a pharmaceutical company, outputs of logics in the data pipeline may include a call plan and an analytical result of what results are expected from execution of the call plan. It may be discovered months after a call plan was generated and implemented that there were additional insurance claims from a particular physician. Based on this updated information, the original scenario may be replayed, and an alternative scenario with the retroactively added additional insurance claims may be assessed. The system may then determine, based on a comparison between the two scenarios, what the call plan should have been and/or what decision should have been made. Additionally, the system may determine what the actual call plan was and whether the sales representative followed the call plan. Additionally, the system may determine how one or more logics and/or a data pipeline should be adjusted based on the comparison. For example, the system may determine a new frequency at which the data pipeline should be run and/or a modification to make to a logic that generates call plans. An example use-case includes calculating compliance to policies generated from historical data (e.g., compliance to a call plan, generated using historical logic and data), but otherwise using best current logic which might contain bug fixes, etc. (like remuneration calculations).

Additionally, if a new logic is being tested (e.g., a new model that generates call plans), then a scenario using the new logic and an old version of datasets (that do not include retroactive changes) may be set up. Another scenario may be set up that uses the old version of the datasets and a logic that was actually used on the old version of the datasets. Outputs of the two scenarios may then be compared to determine whether the new logic produces superior results to the original logic. A superior result in an example may be a call plan that results in a higher return on investment of a sales representative's time. In an example, the new logic may be a more accurate model that predicts growth or shrinkage of physician prescriptions.

In the financial services industry (e.g., stock and bond trading) example set forth above, alerts are generated based on trading data. The alerts identify inappropriate trades by traders of a financial services company. Such inappropriate trades might be trades that constitute insider trading or trades in which clients were charged excessive price markups. The financial services company may audit which alerts have been generated, or would have been generated under new versions of logic. Audit results may be shown to regulators to indicate that the systems of the financial services company are operating correctly, and/or that no inappropriate trades occurred. For the financial services company, it can be valuable that all historical alerts are trackable, that new versions of logic (code) and/or input parameters can be tracked (possibly with old data) without interrupting the production system, and that even those test results are auditable.

Figure 2A:
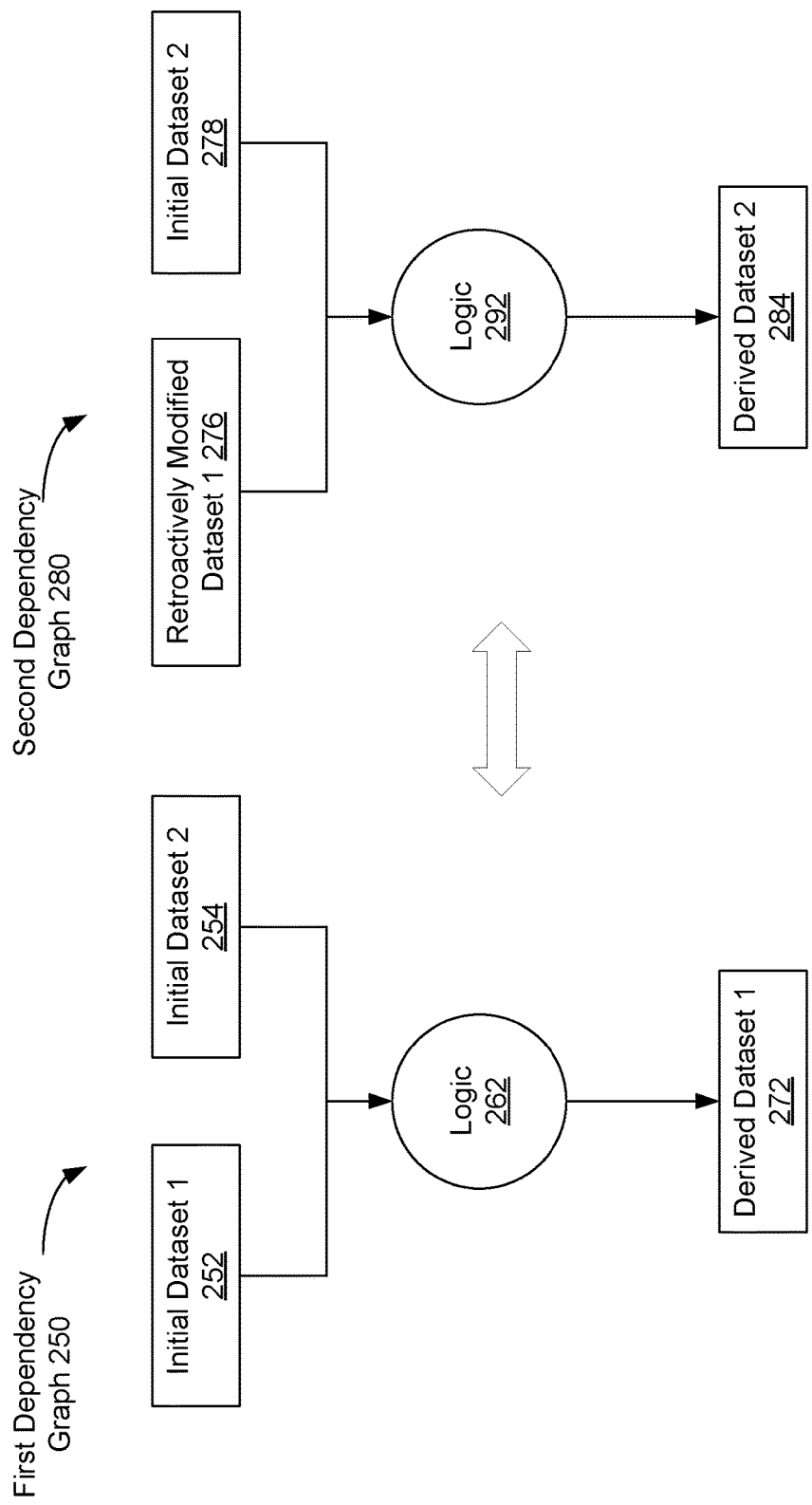
FIG. 2A is a block diagram illustrating sample graph dependency structures of a first scenario and a second scenario as evaluated at a first time.

FIG. 2A is a block diagram illustrating sample graph dependency structures of a first scenario and a second scenario as evaluated at a first time. The graph dependency structures include visual representations of the scenarios, including a first graph 250 corresponding to the first scenario and a second graph 280 corresponding to the second scenario. In one implementation, the first graph 250 includes a first node 252 representing a first initial dataset that includes data that was used at a second time that predates the first time. The first graph 250 further includes a second node 254 representing a second initial dataset. The first graph 250 further includes a third node 272 representing a first derived dataset (output). One or more edges 262 connect the first node 252 and the second node 254 to third node 272. These one or more edges 262 represent the first logic to be applied to the initial dataset(s) in order to produce the derived dataset(s). The first derived dataset of the third node 272 represents an output of the first logic based on application of the first and second initial datasets to the first logic, where the output represents an actual output that was generated at the second time.

In one implementation, the second graph 280 includes a first node 276 representing a retroactively modified version of the first initial dataset used at first node 252. The retroactively modified dataset comprises additional data that predates the second time and was not used at the second time, the additional data having been retroactively added to the first initial dataset after the second time. The second graph 280 further includes a second node 278 representing the second initial dataset that was used at second node 254. The second graph 280 further includes a third node 284 representing a second derived dataset. One or more edges 298 connect the first node 276 and the second node 278 to third node 284. These one or more edges 298 represent the first logic to be applied to the initial dataset in order to produce the derived dataset. In the illustrated implementation, the second initial dataset in the second graph 280 is the same as the initial dataset in the first graph 250. However, the second initial dataset may also include retroactive changes. A retroactively changed version of the second dataset may be applied at second node 278 in some embodiments. Additionally, though two datasets are shown, one dataset or more than two datasets may be used, each of which may be represented as a separate node. The first derived dataset 272 may be different from the second derived dataset in third node 284. The first derived dataset in third node 272 may be compared to the second derived dataset in third node 284 to determine differences there between.

Figure 2B:
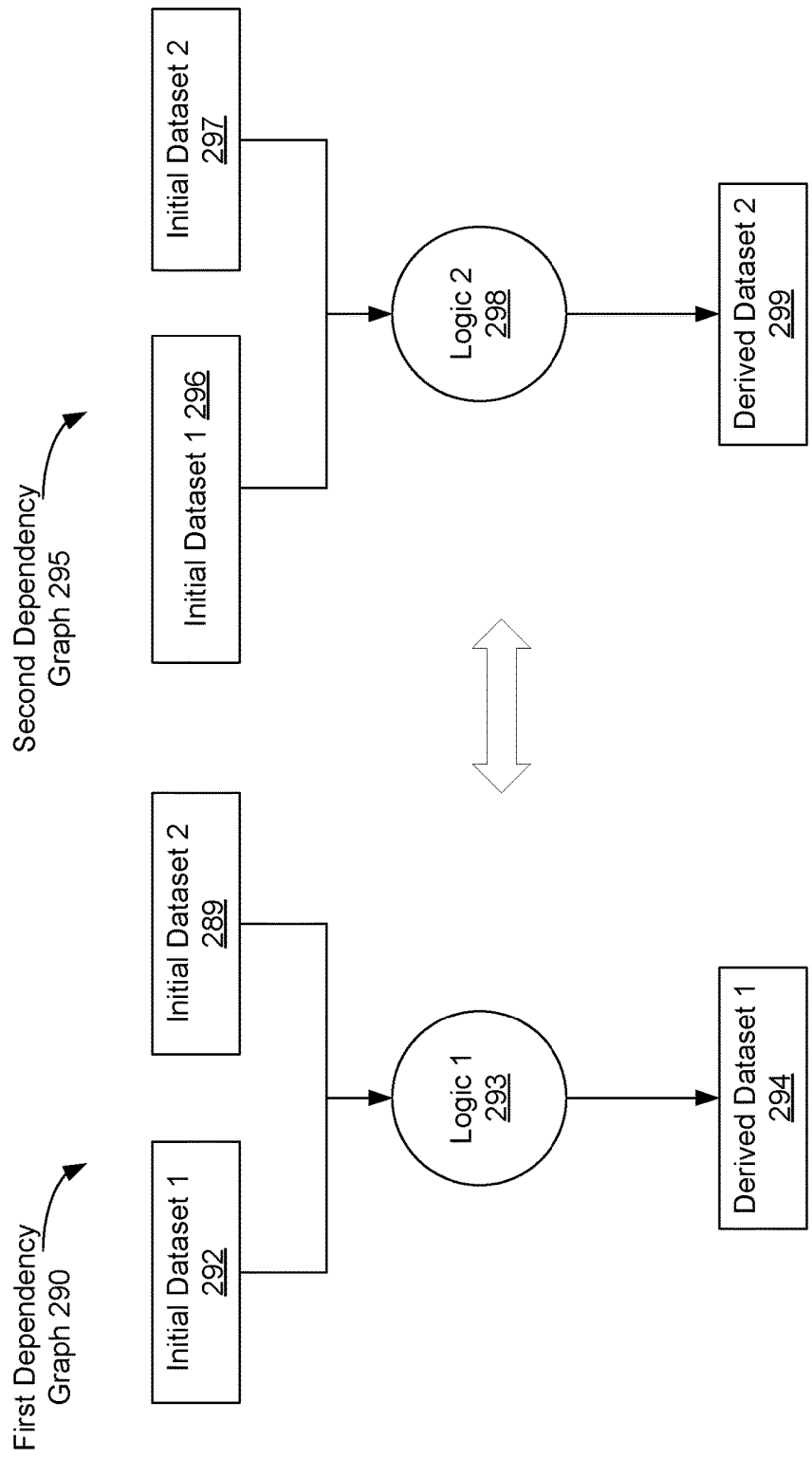
FIG. 2B is a block diagram illustrating sample graph dependency structures of a first scenario and a second scenario as evaluated at a first time.

FIG. 2B is a block diagram illustrating sample graph dependency structures of a first scenario and a second scenario as evaluated at a first time. The graph dependency structures include visual representations of the scenarios, including a first graph 290 corresponding to the first scenario and a second graph 295 corresponding to the second scenario. In one implementation, the first graph 290 includes a first node 292 representing a first initial dataset that includes data that was used at a second time that predates the first time. The first graph 290 further includes a second node 289 representing a second initial dataset. The first graph 290 further includes a third node 294 representing a first derived dataset (output). One or more edges 293 connect the first node 291 and the second node 289 to third node 294. These one or more edges 293 represent the first logic to be applied to the initial dataset(s) in order to produce the derived dataset(s). The first derived dataset of the third node 294 represents an output of the first logic based on application of the first logic to the first and second initial datasets, where the output represents an actual output that was generated at the second time.

In one implementation, the second graph 295 includes a first node 296 representing the first initial dataset used at first node 292. The second graph 295 further includes a second node 297 representing the second initial dataset that was used at second node 289. The second graph 295 further includes a third node 299 representing a second derived dataset. One or more edges 298 connect the first node 296 and the second node 297 to third node 299. These one or more edges 298 represent a second logic to be applied to the initial datasets in order to produce the derived dataset. In the illustrated implementation, the first and second initial datasets in the second graph 295 are the same as the initial datasets in the first graph 290. However, the first and/or second initial datasets may alternatively include retroactive changes. Additionally, though two datasets are shown, one dataset or more than two datasets may be used, each of which may be represented as a separate node. The first derived dataset in third node 294 may be different from the second derived dataset in third node 299. The first derived dataset in third node 294 may be compared to the second derived dataset in third node 299 to determine differences there between.

Some logics are stateful (e.g., may be state machines) and other logics are stateless. For a stateless logic, the same input datasets will always produce the same output. The output of a stateful logic depends not only on input datasets, but also on a state of the logic (e.g., previous outputs of the logic). For a stateful logic, the logic may produce different outputs given the same input datasets, depending on a state of the logic.

An example of a stateful logic is a logic that produces alerts (e.g., notifications) for sales representatives based on data contained in one or more datasets. Each alert may contain particular information and be addressed to a particular recipient. The logic may process datasets at some periodicity, and may generate new outputs at various iterations. Future datasets may contain some of the same information that triggered an alert in a past iteration of applying the logic to the datasets. It may not be beneficial to repeat the same alerts that have already been generated. Accordingly, a state of alerts that have already been generated by the logic may be maintained. At a future iteration of applying the logic to the datasets, the state of the alerts that have already been generated may be an input to the logic, and may affect generation of further alerts. If a particular alert has already been generated, then that alert may not be generated again on the future iteration of applying the datasets to the logic.

In one embodiment, a state of a logic (e.g., of a state machine) may be stored as a dataset. At each iteration of the logic being applied to input datasets, a new state of the logic may be determined, and the state of the logic at that iteration may be stored as a new version of a particular dataset. For example, the first initial dataset or second initial dataset described with reference to FIGS. 2A-B may comprise a state of the logics described with reference to FIGS. 2A-B.

Figure 3:
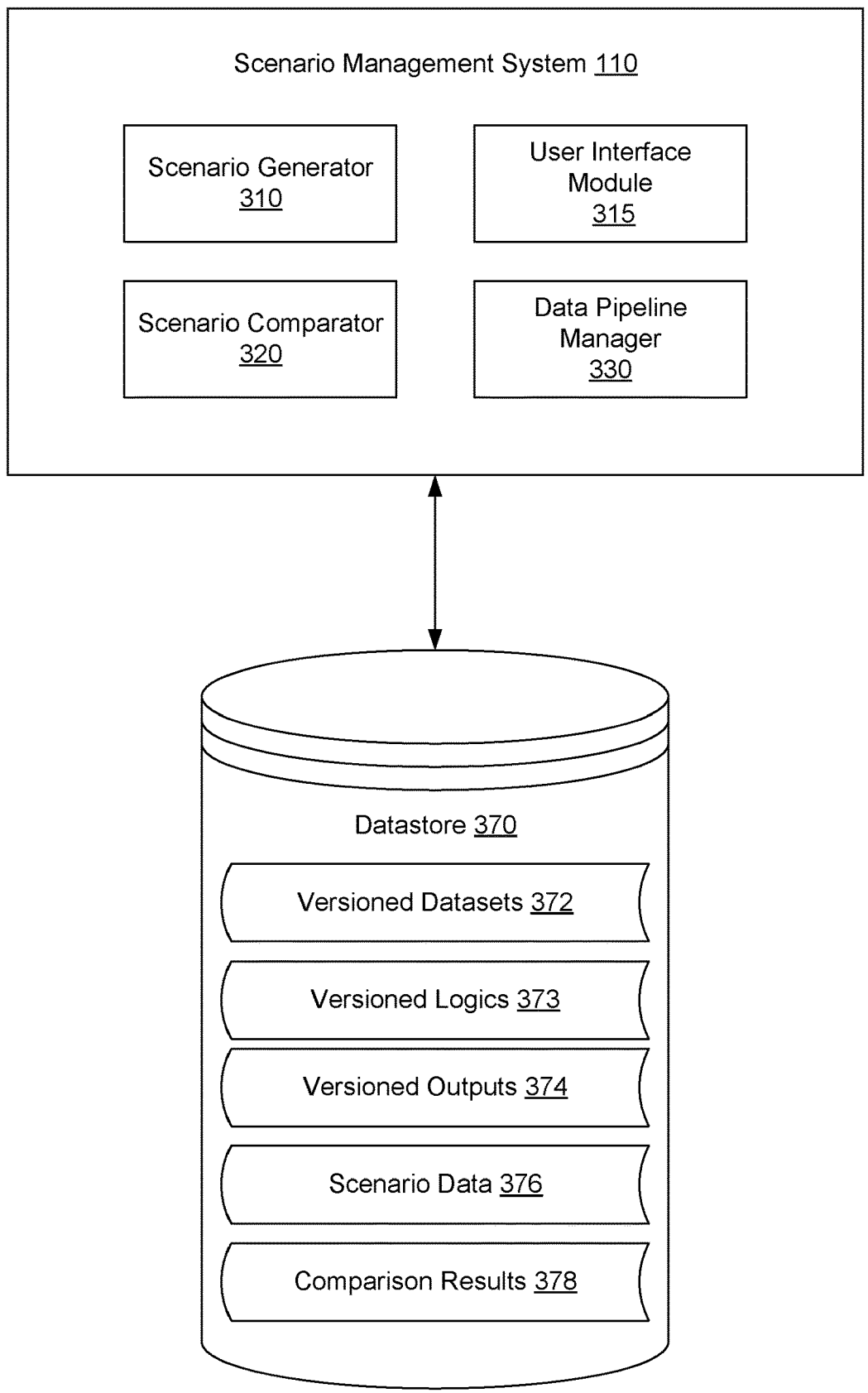
FIG. 3 is a block diagram illustrating scenario management system, according to an implementation.

FIG. 3 is a block diagram illustrating scenario management system 110, according to an implementation. Scenario management system 110 may include scenario generator 310, user interface module 315, scenario comparator 320, and data pipeline manager 330. This arrangement of modules and components may be a logical separation, and in other implementations, these modules or other components can be combined together or separated in further components, according to a particular implementation.

In one implementation, datastore 370 is connected to scenario management system 110 and includes versioned datasets 372, versioned logics 373, versioned outputs 374, scenario data 376 and comparison results 378. Versioned datasets 372 and versioned logics 373 may be stored in datastore 370 in a manner such that each version of a dataset and each version of a logic is immutable. Versioned outputs 374 may also be immutable, and may be a class of a versioned dataset 372 (e.g., a derived dataset). Versioned datasets 372, versioned logics 373 and versioned outputs 374 may collectively be referred to as pipeline data. The data pipeline may be structured such that logic is applied to one or more initial datasets to generate one or more derived datasets, which may in turn be used as input to which additional logic is applied to generate additional derived datasets, and so on. Pipeline data may define the initial dataset(s) and various logic, as well as the order in which the logic is to be applied and to which datasets. A change to the logic or datasets upstream in the pipeline can affect downstream derived datasets due to the nature of the data pipeline.

Scenario data 376 can include identifying information and content information for each scenario generated by scenario management system 110. For example, scenario data 376 may include a set of entries corresponding to each individual scenario. For each scenario, scenario data 376 may include a dependency graph structure indicating one or more versioned datasets and one or more versioned logics. For each scenario, scenario data 376 may include a copy of logic associated with the scenario (or a pointer to the corresponding logic in logic repository 107) and pointers to snapshots of one or more datasets in datastore 105 associated with the scenario. Thus, scenario data 376 may define the logical association between logic and data that makes up each scenario.

Comparison results 378 may include data generated in response to comparing outputs (e.g., versioned outputs 374) of two or more scenarios. For example, scenario management system 110 can perform a comparison operation to determine one or more differences between the output of an original scenario and an alternate scenario. Scenario management system 110 may generate an indication of the differences using comparison results 378 and present that indication to a user (e.g., via an alert).

In one implementation, a single computer system (e.g., data management platform 102) may include both scenario management system 110 and datastore 370. In another implementation, datastore 370 may be external to the computer system and may be connected to scenario management system 110 over a network or other connection. In other implementations, scenario management system 110 may include different and/or additional components which are not shown here to simplify the description. Datastore 370 may include a file system, database or other data management layer resident on one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium. Datastore 370 may be part of datastore 105 or be separate from datastore 105.

In one implementation, scenario generator 310 enables the selection of versions of datasets to use as inputs for one or more logics and a selection of the one or more logics that will receive the datasets as inputs. Scenario generator 310 may also enable selection of one or more parameters to the one or more logics. A single logic may be selected, or multiple logics may be selected, where the output of one logic may be used as an input for another logic in a scenario. Scenario generator 310 can generate a scenario representing a portion of a data pipeline, in response to a user request received by user interface module 315. The user interface module 315 may provide a graphical user interface or application programming interface that a user can interact with to specify a particular date/time period for a scenario, particular versions of one or more datasets, and particular versions of one or more logics. For example, the user interface module 315 may include a knob for scrolling between versions of datasets and another knob for scrolling between versions of logics. A user may select particular versions of datasets from multiple different options of versions, where one option may include data that was used at the particular date/time period and another option may include data that predates the particular date/time period, but that was not used or available at the particular date/time period. A user may select particular versions of logics from multiple different options of versions, where one option may include a version of logic that was used at the particular date/time period and another option may include a version of logic that was not used or available at the particular date/time period. Similarly, a user may select particular parameters for the logics from multiple different available parameter options.

In response to a request to create a new scenario, scenario generator 310 may generate a scenario including a pointer(s) to a snapshot(s) of selected versions of one or more dataset(s) from datastore 105 and a first version of logic from logic repository 107 (and optionally a first version of parameters). The selected versions of dataset(s) and the selected first version of the logic (and optionally the first version of the parameters) may be specified in the user request, and when the first parameters are applied to the first logic and the first logic is applied to the first versions of the dataset(s), a first derived dataset (output) may be generated in the scenario.

Scenario generator 310 may generate multiple different scenarios using various versions of datasets, logics and/or parameters. Scenario comparator 320 may then compare the versioned outputs (derived datasets) 374 included in each of the scenarios. If differences are identified, then those differences may be shown to a user. For example, a notification may be generated that identifies the differences.

In one implementation, user interface module 315 generates a user interface for presentation on any of client devices 130, and processes user interaction with scenario management system 110. For example, user interface module 315 may present a user interface to allow a user to generate one or more scenarios. User interface module 315 may present an indication of one or more differences between the outputs of different scenarios under comparison.

In one implementation, data pipeline manager 330 manages a data pipeline defined by pipeline data. The data pipeline may include logic of multiple data transformation steps. Starting with the initial dataset(s), data pipeline manager 330 may apply logic to generate a derived dataset(s) (e.g., the first derived dataset). Data pipeline manager 330 may further apply additional logic to that derived dataset(s) to generate another derived dataset(s). Pipeline data may define any number of transformation steps and derived datasets that continue in this fashion.

FIGS. 4A-8 are flow diagrams showing various methods of comparing scenarios associated with a data pipeline. The methods may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the methods are performed by scenario management system 110, as shown in FIGS. 1 and 3.

Figure 4A:
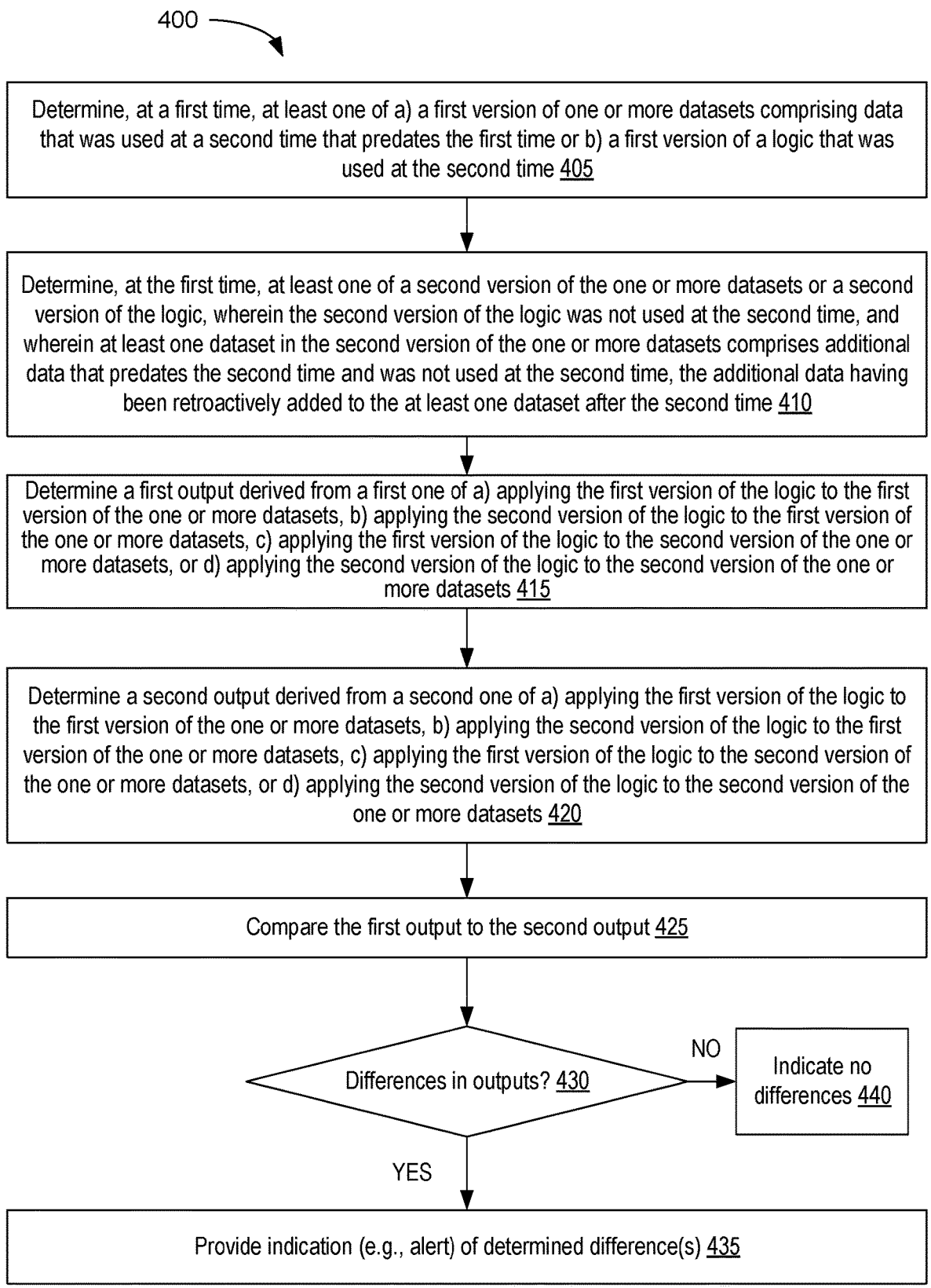
FIG. 4A is a flow diagram illustrating a method of comparing scenarios of a data pipeline, according to an implementation.

Referring to FIG. 4A, at block 405 of method 400 processing logic determines, at a first time, at least one of a) a first version of one or more datasets comprising data that was used at a second time that predates the first time or b) a first version of a logic that was used at the second time. The first time may be a current time at which a user initiates a query and/or requests that one or more scenarios be generated and/or compared. The second time may be a past date/time. A single past time may be selected for both data and logic. Alternatively, a first past time may be selected for data and a second past time may be selected for logic. The first time and second time may refer to particular dates and/or time periods rather than exact moments in time. Accordingly, operations that are performed on the same date and/or within minutes or hours of each other may be considered to be performed at the first time.

In one embodiment, a first input identifying at least one of the first version of the one or more data sets or the first version of the logic is received via a user interface that enables selection of specified versions of specified datasets and selection of specified versions of specified logics from one or more data stores. Data stored in the one or more data stores is immutable such that modifications to the one or more datasets causes new versions of the one or more datasets to be generated without affecting prior versions of the one or more datasets.

At block 410, processing logic determines, at the first time, at least one of a second version of the one or more datasets or a second version of the logic. The second version of the logic was not used at the second time, and at least one dataset in the second version of the one or more datasets comprises additional data that predates the second time and was not used at the second time, the additional data having been retroactively added to the at least one dataset after the second time.

In one embodiment, a second input identifying at least one of a) the first version of the one or more datasets and the second version of the logic, b) the second version of the one or more datasets and the first version of the logic, or c) the second version of the one or more datasets and the second version of the logic is received via the user interface.

In some instances at least one of the one or more datasets is a stateless dataset and another of the one or more datasets is a stateful dataset. The stateful dataset may represent a state of a particular version of a logic (e.g., of the first version of the logic) at the second time.

At block 415, processing logic determines a first output derived from a first one of a) applying the first version of the logic to the first version of the one or more datasets, b) applying the second version of the logic to the first version of the one or more datasets, c) applying the first version of the logic to the second version of the one or more datasets, or d) applying the second version of the logic to the second version of the one or more datasets. This may include generating a first scenario and determining a derived output of the first scenario. In one embodiment, processing logic determines a first action set forth in the first output, wherein the first action was performed in connection with the first output.

At block 420, processing logic determines a second output derived from a second one of a) applying the first version of the logic to the first version of the one or more datasets, b) applying the second version of the logic to the first version of the one or more datasets, c) applying the first version of the logic to the second version of the one or more datasets, or d) applying the second version of the logic to the second version of the one or more datasets. This may include generating a second scenario and determining a derived output of the second scenario. In one embodiment, processing logic determines a second action set forth in the second output. The second action may be an action that should be performed in connection with the second output.

In one embodiment, the first output is derived from applying the first version of the logic to the first version of the one or more datasets and the second output is derived from applying the first version of the logic to the second version of the one or more datasets. In the embodiment, the one or more datasets include a stateful dataset representing a state of the first version of the logic. The state of the first version of the logic may comprise one or more alerts that had already been generated prior to the second time. The first output may comprise one or more additional alerts to be generated, and the first output may exclude the one or more alerts that had already been generated prior to the second time.

At block 425, processing logic compares the first output to the second output. At block 430, processing logic determines whether there are any differences between the first output and the second output. If no differences are determined, then the method proceeds to block 440, and an indication that no differences were determined may be generated. If one or more differences are determined, the method continues to block 435. At block 435, processing logic provides an indication of the determined differences. This may include generating an alert that indicates the determined differences.

In one embodiment, processing logic displays, via a graphical user interface (GUI), a first graphical representation of a first scenario that provides an association between the first version of the one or more datasets, the first version of the logic and the first output. The first graphical representation may comprise a first graph that includes a first node representing the first version of the one or more datasets, a second node representing the first output, and a first edge connecting the first node and the second node. The first edge references the first version of the logic to be applied to the first version of the one or more datasets in order to produce the first output. In one embodiment, processing logic displays, via the GUI, a second graphical representation of a second scenario that provides an association between at least one of a) the first version of the one or more datasets, the second version of the logic and the second output, b) the second version of the one or more datasets, the first version of the logic and the second output, or c) the second version of the one or more datasets, the second version of the logic and the second output. The second graphical representation may comprise a second graph that includes a third node representing the first version of the one or more datasets or the second version of the one or more datasets, a second node representing the first output, and a first edge connecting the first node and the second node. In one embodiment, the GUI further includes a graphical indication of the differences between the first output and the second output.

Referring to FIG. 4B, at block 450 of method 445 processing logic determines, at a first time, at least one of a) a first version of one or more datasets comprising data that was used at a second time that predates the first time, b) a first version of a logic that was used at the second time, or c) a first version of parameters to the logic that were used at the second time. The first time may be a current time at which a user initiates a query and/or requests that one or more scenarios be generated and/or compared. The second time may be a past date/time. A single past time may be selected for both data and logic. Alternatively, a first past time may be selected for data and a second past time may be selected for logic. The first time and second time may refer to particular dates and/or time periods rather than exact moments in time. Accordingly, operations that are performed on the same date and/or within minutes or hours of each other may be considered to be performed at the first time.

In one embodiment, a first input identifying at least one of the first version of the one or more data sets, the first version of the logic, or the first version of the parameters to the logic is received via a user interface that enables selection of specified versions of specified datasets, selection of specified versions of specified logics, and/or selection of specified parameters to logic from one or more data stores. Data stored in the one or more data stores is immutable such that modifications to the one or more datasets causes new versions of the one or more datasets to be generated without affecting prior versions of the one or more datasets.

At block 455, processing logic determines, at the first time, at least one of a second version of the one or more datasets, a second version of the logic, or a second version of parameters to the logic. In one embodiment, the second version of the logic was not used at the second time. In one embodiment, at least one dataset in the second version of the one or more datasets comprises additional data that predates the second time and was not used at the second time, the additional data having been retroactively added to the at least one dataset after the second time.

In one embodiment, a second input identifying at least one of b) the first version of the one or more datasets, the first version of the logic, and the second version of the parameters, c) the first version of the one or more datasets, the second version of the logic, and the first version of the parameters, d) the second version of the one or more datasets, the first version of the logic, and the first version of the parameters, e) the first version of the one or more datasets, the second version of the logic, and the second version of the parameters, f) the second version of the one or more datasets, the second version of the logic, and the first version of the parameters, or g) the second version of the one or more datasets, the second version of the logic, and the second version of the parameters is received via the user interface.

In some instances at least one of the one or more datasets is a stateless dataset and another of the one or more datasets is a stateful dataset. The stateful dataset may represent a state of a particular version of a logic (e.g., of the first version of the logic) at the second time.

At block 460, processing logic determines a first output derived from a first one of a) the first version of the one or more datasets, the first version of the logic, and the first version of the parameters, b) the first version of the one or more datasets, the first version of the logic, and the second version of the parameters, c) the first version of the one or more datasets, the second version of the logic, and the first version of the parameters, d) the second version of the one or more datasets, the first version of the logic, and the first version of the parameters, e) the first version of the one or more datasets, the second version of the logic, and the second version of the parameters, f) the second version of the one or more datasets, the second version of the logic, and the first version of the parameters, or g) the second version of the one or more datasets, the second version of the logic, and the second version of the parameters. This may include generating a first scenario and determining a derived output of the first scenario. In one embodiment, processing logic determines a first action set forth in the first output, wherein the first action was performed in connection with the first output.

At block 420, processing logic determines a second output derived from a second one of a) the first version of the one or more datasets, the first version of the logic, and the first version of the parameters, b) the first version of the one or more datasets, the first version of the logic, and the second version of the parameters, c) the first version of the one or more datasets, the second version of the logic, and the first version of the parameters, d) the second version of the one or more datasets, the first version of the logic, and the first version of the parameters, e) the first version of the one or more datasets, the second version of the logic, and the second version of the parameters, f) the second version of the one or more datasets, the second version of the logic, and the first version of the parameters, or g) the second version of the one or more datasets, the second version of the logic, and the second version of the parameters. This may include generating a second scenario and determining a derived output of the second scenario. In one embodiment, processing logic determines a second action set forth in the second output. The second action may be an action that should be performed in connection with the second output.

At block 470, processing logic compares the first output to the second output. At block 475, processing logic determines whether there are any differences between the first output and the second output. If no differences are determined, then the method proceeds to block 485, and an indication that no differences were determined may be generated. If one or more differences are determined, the method continues to block 480. At block 480, processing logic provides an indication of the determined differences. This may include generating an alert that indicates the determined differences.

Referring to FIG. 5, method 500 includes rolling back a state of a data pipeline to determine suggested and performed actions at a past time and to make determinations based on the suggested and performed actions, in accordance with some implementations. At block 505 of method 500, processing logic determines, at a first time (e.g., a current time), a) a first version of one or more datasets comprising data that was used at a second time (e.g., a past time) that predates the first time and b) a first version of a logic that was used at the second time.

At block 515, processing logic determines a first output derived from applying the first version of the logic to the first version of the one or more datasets (e.g., in a first scenario). At block 520, processing logic determines, at the first time, one or more performed actions that were performed at the second time.

At block 525, processing logic compares the performed action or actions to the suggested action or actions. At block 530, processing logic determines whether there are any differences between the performed actions and the suggested actions (e.g., whether the suggested actions were actually performed). If no differences are determined, then the method proceeds to block 550, and an indication that no differences were determined may be generated. If one or more differences are determined, the method continues to block 535. At block 535, processing logic provides an indication of the determined differences. This may include generating an alert that indicates the determined differences.

Figure 6:
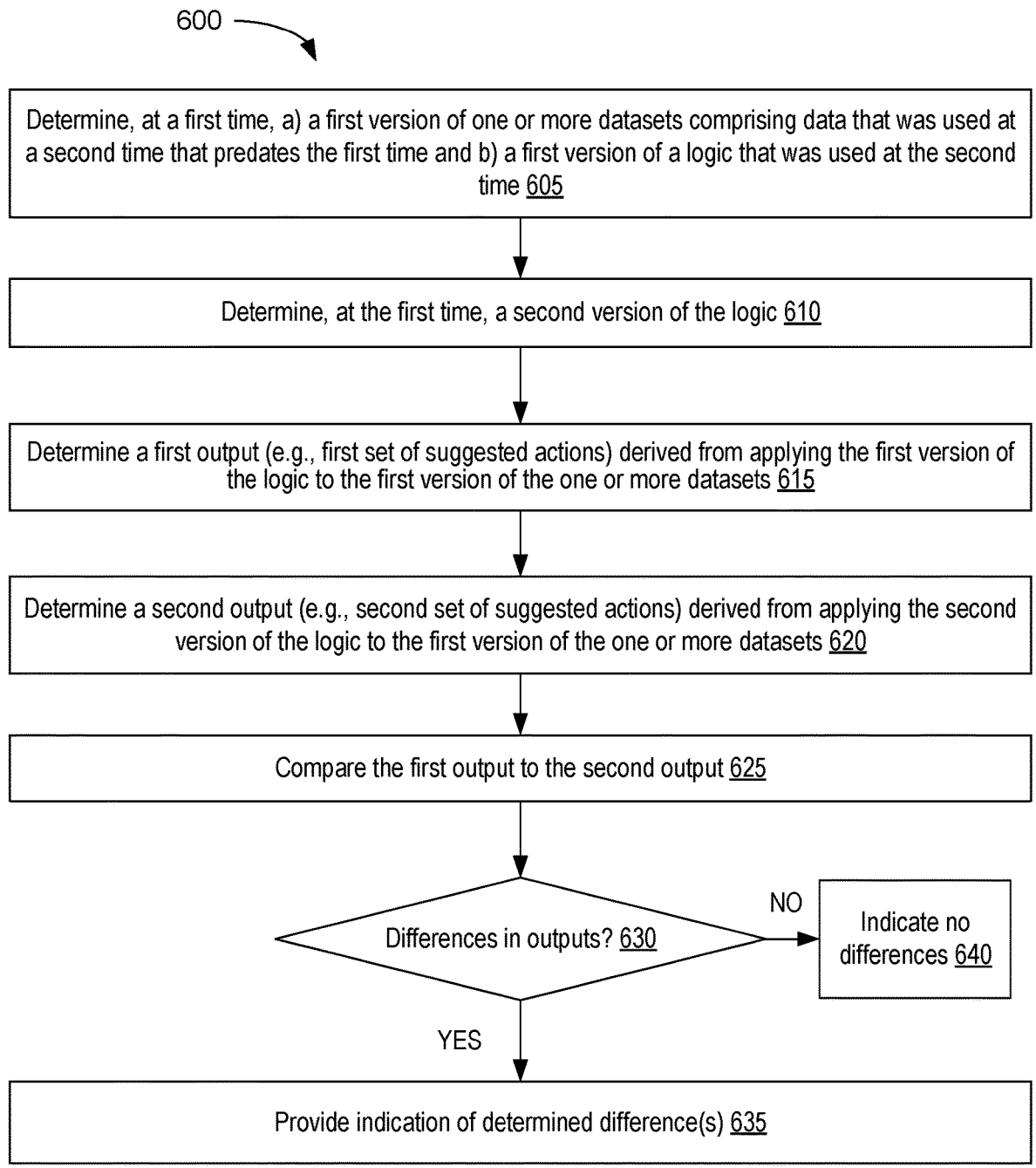
FIG. 6 is a flow diagram illustrating a method of rolling back a state of a data pipeline to determine an output generated at a past time and comparing the generated output to a possible alternative output that would have been generated had a different version of a logic been used, according to an implementation.

Referring to FIG. 6, method 600 includes rolling back a state of a data pipeline to determine an output generated at a past time and comparing the generated output to a possible alternative output that would have been generated had a different version of a logic been used, in accordance with some implementations. At block 605 of method 600 processing logic determines, at a first time, a) a first version of one or more datasets comprising data that was used at a second time that predates the first time and b) a first version of a logic that was used at the second time.

At block 610, processing logic determines, at the first time, a second version of the logic that was not used at the second time. At block 615, processing logic determines a first output derived from applying the first version of the logic to the first version of the one or more datasets. This may include generating a first scenario and determining a first derived dataset of the first scenario. The first derived dataset may include a first set of suggested actions in an embodiment.

At block 620, processing logic determines a second output derived from applying the second version of the logic to the first version of the one or more datasets. This may include generating a second scenario and determining a derived output of the second scenario. The second derived dataset may include a second set of suggested actions in one embodiment.

At block 625, processing logic compares the first output to the second output. At block 630, processing logic determines whether there are any differences between the first output and the second output. If no differences are determined, then the method proceeds to block 640, and an indication that no differences were determined may be generated. If one or more differences are determined, the method continues to block 635. At block 635, processing logic provides an indication of the determined differences. This may include generating an alert that indicates the determined differences.

Additional data may be available for a time period between the first time and the second time. This additional data may be compared to the first and second outputs to determine return on investment (ROI) associated with each of the outputs. If use of the second version of the logic results in a higher ROI than use of the first version of the logic, then the second version of the logic may be deemed superior to the first version of the logic.

Figure 7:
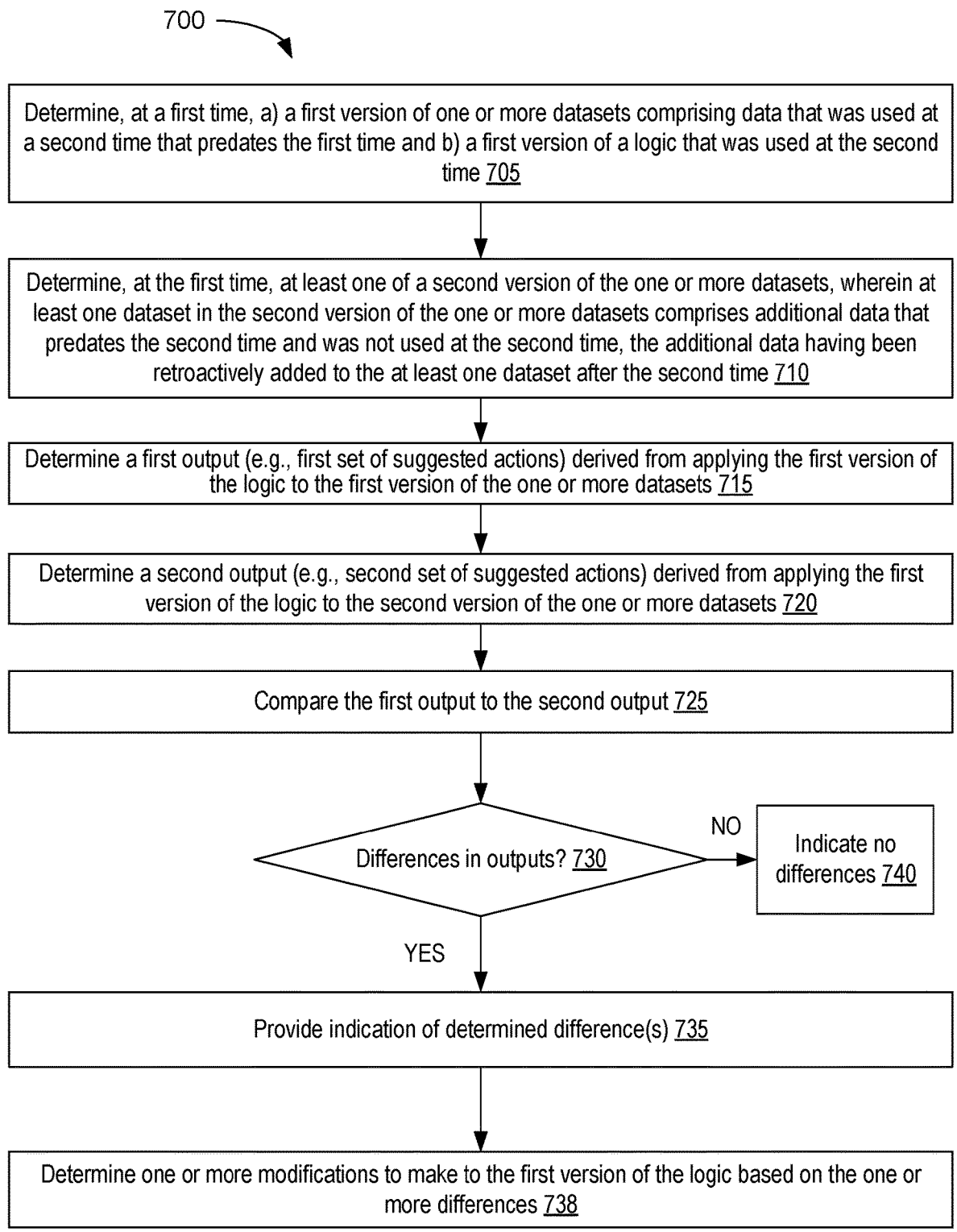
FIG. 7 is a flow diagram illustrating a method of rolling back a state of a data pipeline to determine an output generated at a past time and comparing the generated output to a possible alternative output that would have been generated had a different version of a dataset been used, according to an implementation.

Referring to FIG. 7, method 700 includes rolling back a state of a data pipeline to determine an output generated at a past time and comparing the generated output to a possible alternative output that would have been generated had a different version of a dataset been used, in accordance with some implementations. At block 705 of method 700 processing logic determines, at a first time, a) a first version of one or more datasets comprising data that was used at a second time that predates the first time and b) a first version of a logic that was used at the second time.

At block 710, processing logic determines, at the first time, a second version of the one or more datasets that was not used at the second time. At least one dataset in the second version of the one or more datasets comprises additional data that predates the second time and was not used at the second time, the additional data having been retroactively added to the at least one dataset after the second time At block 715, processing logic determines a first output derived from applying the first version of the logic to the first version of the one or more datasets. This may include generating a first scenario and determining a first derived dataset of the first scenario. The first derived dataset may include a first set of suggested actions in an embodiment.

At block 720, processing logic determines a second output derived from applying the second version of the logic to the first version of the one or more datasets. This may include generating a second scenario and determining a derived output of the second scenario. The second derived dataset may include a second set of suggested actions in one embodiment.

At block 725, processing logic compares the first output to the second output. At block 730, processing logic determines whether there are any differences between the first output and the second output. If no differences are determined, then the method proceeds to block 740, and an indication that no differences were determined may be generated. If one or more differences are determined, the method continues to block 735. At block 735, processing logic provides an indication of the determined differences. This may include generating an alert that indicates the determined differences. At block 738, processing logic may additionally determine one or more modification to make to the first version of the logic based on the one or more differences. For example, the logic may be adjusted by updating a model associated with or included in the logic. The updated logic may increase a return on investment (ROI) associated with actions included in or associated with an output of the logic applied to the datasets.

Figure 8:
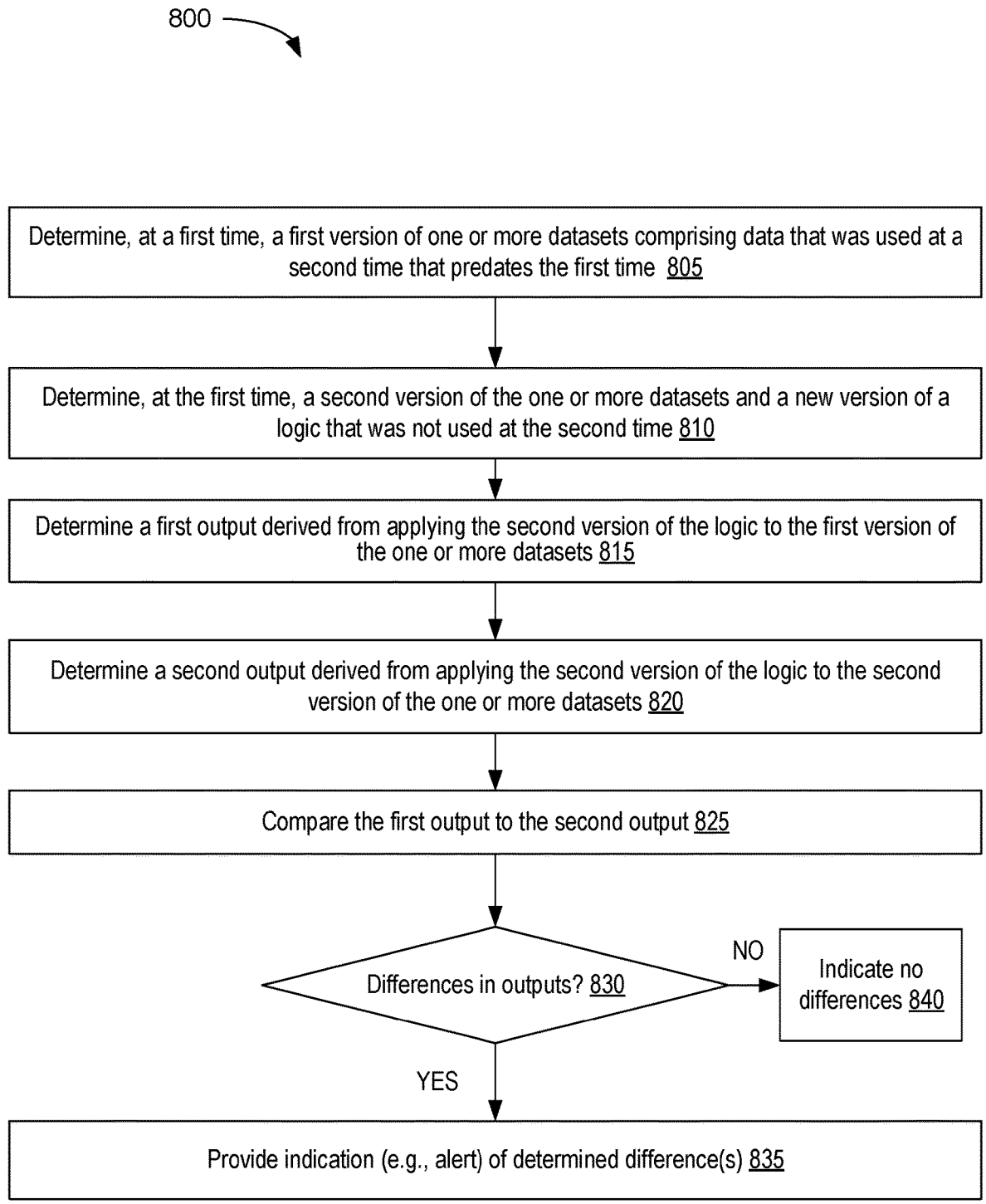
FIG. 8 is a flow diagram illustrating a method of comparing application of a new logic to original versions of historical datasets (without retroactive changes) and application of the new logic to new versions of the historical datasets (with retroactive changes), according to an implementation.

Referring to FIG. 8, method 800 includes comparing application of a new logic to original versions of datasets (without retroactive changes) and application of the new logic to new versions of the datasets (with retroactive changes), in accordance with some implementations. At block 805 of method 800 processing logic determines, at a first time, a first version of one or more datasets comprising data that was used at a second time that predates the first time. Processing logic may also determine a first version of a logic that was used at the second time.

At block 810, processing logic determines, at the first time, a second version of the one or more datasets that was not used at the second time and a second version of the logic that was not used at the second time. At least one dataset in the second version of the one or more datasets comprises additional data that predates the second time and was not used at the second time, the additional data having been retroactively added to the at least one dataset after the second time At block 815, processing logic determines a first output derived from applying the second version of the logic to the first version of the one or more datasets. This may include generating a first scenario and determining a first derived dataset of the first scenario. The first derived dataset may include a first set of suggested actions in an embodiment.

At block 820, processing logic determines a second output derived from applying the second version of the logic to the second version of the one or more datasets. This may include generating a second scenario and determining a derived output of the second scenario. The second derived dataset may include a second set of suggested actions in one embodiment.

At block 825, processing logic compares the first output to the second output. At block 830, processing logic determines whether there are any differences between the first output and the second output. If no differences are determined, then the method proceeds to block 840, and an indication that no differences were determined may be generated. If one or more differences are determined, the method continues to block 835. At block 835, processing logic provides an indication of the determined differences. This may include generating an alert that indicates the determined differences.

Multiple examples have been discussed with reference to data pipelines that are associated with sales representatives for a pharmaceutical company, where data such as insurance claims regularly include retroactive updates. However, it should be understood that embodiments of the present disclosure are not limited to the pharmaceutical industry or to sales. Embodiments apply to any industry or use case in which datasets are periodically or continuously changed retroactively. For example, embodiments may apply to sensor data and diagnostics and repairs in the airline industry. Sensor data that is generated while an airplane is in flight may be sent to a server wirelessly, and such sensor data may be included in a dataset. A logic may be applied to the dataset to derive an output that may include one or more diagnoses of a problem in the airplane and/or suggested responses to the problem. The sensor data provided while the airplane is in flight may be low fidelity data. Once the airplane lands, a larger amount of sensor data (e.g., high fidelity data) may be transmitted to the server. The data may reflect a past condition of the airplane (while the airplane was in flight), and may be used to retroactively update the dataset including the sensor data. The update to the sensor data may cause a different output to be generated, which may include a different diagnosis and/or a different suggested response to the problem.

Figure 9:
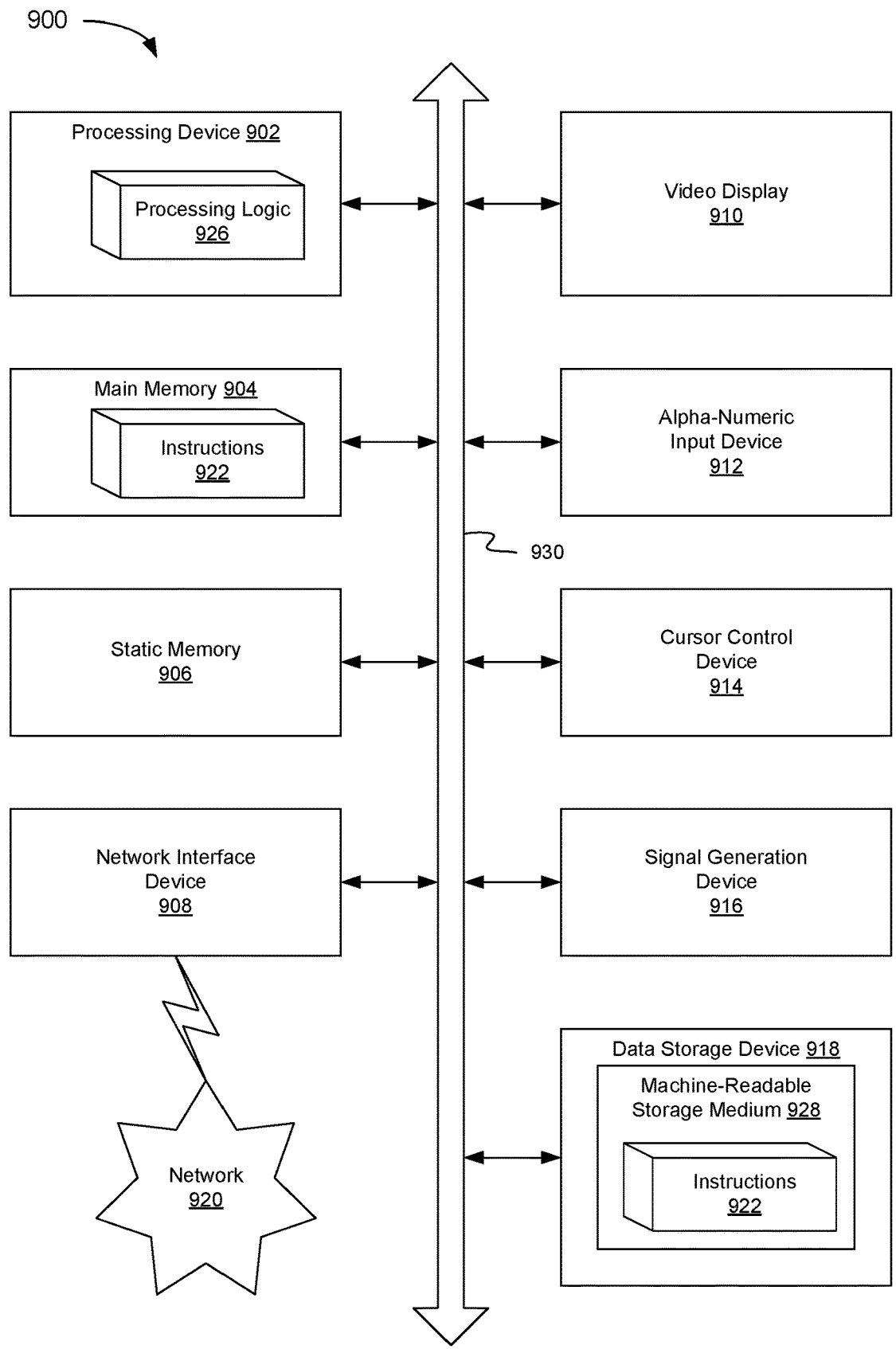
FIG. 9 is a block diagram illustrating a computer system, according to an implementation.

FIG. 9 illustrates a diagrammatic representation of a machine in the exemplary form of a computer system 900 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, computer system 900 may be representative of a computing device, such as a server of data management platform 102 running scenario management system 110 or a client device 130.

The exemplary computer system 900 includes a processing device 902, a main memory 904 (e.g., read-only memory (ROM), flash memory, dynamic random access memory (DRAM) (such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute processing logic 926 for performing the operations and steps discussed herein.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The data storage device 918 may include a machine-readable storage medium 928, on which is stored one or more set of instructions 922 (e.g., software) embodying any one or more of the methodologies of functions described herein. The instructions 922 may also reside, completely or at least partially, within the main memory 904 and/or within the processing device 902 during execution thereof by the computer system 900; the main memory 904 and the processing device 902 also constituting machine-accessible storage media. The instructions 922 may further be transmitted or received over a network 920 via the network interface device 908.

The machine-readable storage medium 928 may also be used to store instructions of data pipeline branching, as described herein. While the machine-readable storage medium 928 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "comparing," "storing," "generating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any procedure for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
    obtaining, by a processing device at a first time, a first derived dataset setting forth a first set of actions for a first input, wherein the first derived dataset is determined by applying a first version of logic to the first input, and wherein the first input comprises a first dataset and a first version of a second dataset, the first version of the second dataset comprising first data;
    obtaining, by the processing device at a second time after the first time, a second version of the second dataset, wherein the second version of the second dataset comprises the first data and retroactively added second data that predates the first time and was not included in the first version of the second dataset at the first time for obtaining the first derived dataset, the retroactively added second data having been retroactively added to the second dataset after the first time;
    determining, by the processing device, a second derived dataset setting forth a second set of actions for a second input by applying a second version of the logic to the second input, wherein the second input comprises the first dataset and the second version of the second dataset;
    comparing, by the processing device, the first derived dataset to the second derived dataset; and
    determining, by the processing device, one or more differences between the first set of actions and the second set of actions based on the comparing due to the retroactively added second data, wherein the one or more differences include an action applied to the second version of the second dataset being in the second set of actions and the action not in the first set of actions.

2. The method of claim 1, further comprising:
    determining, by the processing device at the second time, one or more performed actions that were performed in connection with the first derived dataset; and
    determining, by the processing device, whether the one or more performed actions correspond to one or more suggested actions that were suggested based on the first derived dataset.

3. The method of claim 1, wherein:
    the first set of actions comprises a first set of suggested actions; and
    the second set of actions comprises a second set of suggested actions.

4. The method of claim 1, further comprising:
    determining, by the processing device, one or more modifications to the first version of the logic based on the one or more differences between the first set of actions and the second set of actions.

5. The method of claim 1, wherein the second dataset comprises:
    a stateful dataset, the first version of the second dataset comprising a state of the first version of the logic.

6. The method of claim 5, wherein the state of the first version of the logic comprises one or more alerts that had already been generated prior to the first time, wherein the first derived dataset comprises one or more additional alerts to be generated, and wherein the first derived dataset excludes the one or more alerts that had already been generated prior to the first time.

7. The method of claim 1, further comprising:
    generating, by the processing device, an alert comprising a notification of the one or more differences between the first set of actions and the second set of actions.

8. The method of claim 1, further comprising:
    receiving, by the processing device, a first user input identifying the first version of the second dataset and the first version of the logic via a user interface, the first user input enabling selection of the first version of the second dataset from a data store and selection of the first version of the logic from a logic store, wherein data stored in the data store is immutable such that a modification to the second dataset causes a new version of the second dataset to be generated without affecting a prior version of the second dataset; and receiving, by the processing device via the user interface, a second user input identifying the second version of the second dataset and the second version of the logic.

9. The method of claim 1, further comprising:
determining, by the processing device, a first action of the first set of actions that was performed in connection with the first derived dataset; and
determining, by the processing device, a second action of the second set of actions that should have been performed in connection with the first derived dataset.

10. The method of claim 1, further comprising:
displaying, by the processing device via a graphical user interface (GUI), a first graphical representation of a first scenario that provides an association between the first dataset, the first version of the second dataset, the first version of the logic and the first derived dataset, the first graphical representation comprising a first graph that includes a first node representing the first dataset, a second node representing the first version of the second dataset, and a third node representing the first derived dataset; and
displaying, by the processing device via the GUI, a second graphical representation of a second scenario that provides an association between the first dataset, the second version of the second dataset, the second version of the logic and the second derived dataset, the second graphical representation comprising a second graph that includes a fourth node representing the first dataset, a fifth node representing the second version of the second dataset, and a sixth node representing the second derived dataset.

11. A system comprising:
memory; and
one or more processors coupled to the memory, the one or more processors to:
obtain, at a first time, a first derived dataset setting forth a first set of actions for a first input, wherein the first derived dataset is determined by applying a first version of logic to the first input, and wherein the first input comprises a first dataset and a first version of a second dataset, the first version of the second dataset comprising first data;
obtain, at a second time after the first time, a second version of the second dataset, wherein the second version of the second dataset comprises the first data and retroactively added second data that predates the first time and was not included in the first version of the second dataset at the first time for obtaining the first derived dataset, the retroactively added second data having been retroactively added to the second dataset after the first time;
determine a second derived dataset setting forth a second set of actions for a second input by applying a second version of the logic to the second input, wherein the second input comprises the first dataset and the second version of the second dataset;
make a comparison of the first derived dataset to the second derived dataset; and
determine one or more differences between the first set of actions and the second set of actions based on the comparing due to the retroactively added second data, wherein the one or more differences include an action applied to the second version of the second dataset being in the second set of actions and the action not in the first set of actions.

12. The system of claim 11, wherein the one or more processors are further to:
determine, at the first time, one or more performed actions that were performed in connection with the first derived dataset; and
determine whether the one or more performed actions correspond to one or more suggested actions that were suggested based on the first derived dataset.

13. The system of claim 11, wherein:
the first set of actions comprises a first set of suggested actions; and
the second set of actions comprises a second set of suggested actions.

14. The system of claim 11, wherein the second dataset comprises:
a stateful dataset, the first version of the second dataset comprising a state of the first version of the logic.

15. The system of claim 11, wherein the one or more processors are further to:
receive a first user input identifying the first version of the second dataset and the first version of the logic via a user interface, the first user input enabling selection of the first version of the second dataset from a data store and selection of the first version of the logic from a logic store, wherein data stored in the data store is immutable such that a modification to the second dataset causes a new version of the second dataset to be generated without affecting a prior version of the second dataset; and
receive a second user input identifying the second version of the second dataset and the second version of the logic.

16. A non-transitory computer readable storage medium storing instructions that, when executed by one or more processors, cause the one or more processors to:
obtain, at a first time, a first derived dataset setting forth a first set of actions for a first input, wherein the first derived dataset is determined by applying a first version of logic to the first input, and wherein the first input comprises a first dataset and a first version of a second dataset, the first version of the second dataset comprising first data;
obtain, at a second time after the first time, a second version of the second dataset, wherein the second version of the second dataset comprises the first data and retroactively added second data that predates the second time and was not used at the second time for obtaining the first derived dataset, the retroactively added second data having been retroactively added to the second dataset after the first time;
determine a second derived dataset setting forth a second set of actions for a second input by applying a second version of the logic to the second input, wherein the second input comprises the first dataset and the second version of the second dataset;
make a comparison of the first derived dataset to the second derived dataset; and
determine one or more differences between the first set of actions and the second set of actions based on the comparing due to the retroactively added second data, wherein the one or more differences include an action applied to the second version of the second dataset being in the second set of actions and the action not in the first set of actions.

17. The non-transitory computer readable storage medium of claim 16, wherein:
    the first set of actions comprises a first set of suggested actions; and
    the second set of actions comprises a second set of suggested actions.

18. The system of claim 11, wherein the one or more processors are further to perform at least one of:
    determine one or more modifications to the first version of the logic based on the one or more differences between the first set of actions and the second set of actions; or
    generate an alert comprising a notification of the one or more differences between the first set of actions and the second set of actions.

19. The system of claim 11, wherein the one or more processors are further to:
    determine a first action of the first set of actions that was performed in connection with the first derived dataset; and
    determine a second action of the second set of actions that should have been performed in connection with the first derived dataset.

20. The system of claim 11, wherein the one or more processors are further to:
    display, via a graphical user interface (GUI), a first graphical representation of a first scenario that provides an association between the first dataset, the first version of the second dataset, the first version of the logic and the first derived dataset, the first graphical representation comprising a first graph that includes a first node representing the first dataset, a second node representing the first version of the second dataset, and a third node representing the first derived dataset; and
    display, via the GUI, a second graphical representation of a second scenario that provides an association between the first dataset, the second version of the second dataset, the second version of the logic and the second derived dataset, the second graphical representation comprising a second graph that includes a fourth node representing the first dataset, a fifth node representing the second version of the second dataset, and a sixth node representing the second derived dataset.

* * * * *